United States Patent Office 3,770,734
Patented Nov. 6, 1973

3,770,734
3-OXO-2,3-DIHYDRO-1,4-BENZOXAZINE DERIVATIVES
Marcel Pesson, Paris, and Henri Techer, Avon, France, assignors to Laboratoire Roger Bellon, Neuilly-sur-Seine, France
No Drawing. Filed Feb. 4, 1970, Ser. No. 8,753
Claims priority, application France, June 2, 1969, 6902748
Int. Cl. C07d 87/48
U.S. Cl. 260—244 R ............ 8 Claims

ABSTRACT OF THE DISCLOSURE

6 - aminoalkyl - 3 - oxo-2,3-dihydro-1,4-benzoxazines, which may be made by reaction of a secondary amine with a 6 - haloalkyl - 3 - oxo-2,3-dihydro-1,4-benzoxazine, and which may be used as central nervous depressants.

---

This invention relates to 3-oxo-2,3-dihydro-1,4-benzoxazine derivatives, their preparation and to pharmaceutical compositions containing them.

The present invention provides 3-oxo-2,3-dihydro-1,4-benzoxazine derivatives of the formula:

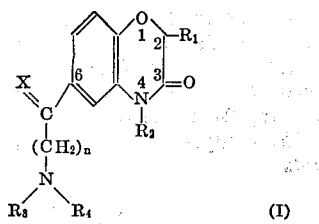

wherein each of $R_1$ and $R_2$, which may be the same or different, represents a hydrogen atom or a lower alkyl radical; each of $R_3$ and $R_4$ which may be the same or different, represents a lower alkyl radical or $R_3$ and $R_4$ together with the nitrogen atom to which they are attached form a five- or six-membered heterocyclic ring; $>C=X$ represents $>C=O$,

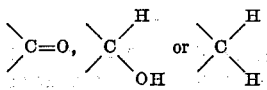

and $n$ is an integer of 1 to 4; and non-toxic acid addition salts thereof.

The heterocyclic ring formed by $R_3$ and $R_4$ together with the nitrogen atom to which they are attached may contain other heteroatoms in addition to the nitrogen atom. Such radicals include piperidyl, pyrrolidyl, morpholino, piperazinyl, 4-alkylpiperazinyl and 4-arylpiperazinyl.

The term "lower alkyl" when used herein means an alkyl radical containing 1 to 5 carbon atoms.

The compounds of the invention can be prepared by a process which comprises reacting a compound of the formula:

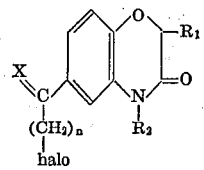

wherein $R_1$, $R_2$ and $n$ are as hereinbefore defined, $>C=X$ represents $>C=O$ or

and halo represents a halogen atom, preferably a chlorine atom, with a secondary amine of the formula:

wherein $R_3$ and $R_4$ are as hereinbefore defined and, if desired, when $>C=X$ represents $>C=O$, reducing the product so obtained to convert the $>C=O$ group to a

group and optionally converting the base obtained into a non-toxic acid addition salt thereof.

In particular, the following procedures can be adopted:
(A) The compounds of Formula I wherein $>C=X$ represents $>C=O$ may be prepared by reaction of secondary amines with substituted 6-halogenacyl-3-oxo-2,3-dihydro-1,4-benzoxazines of the Formula II in accordance with the following equation:

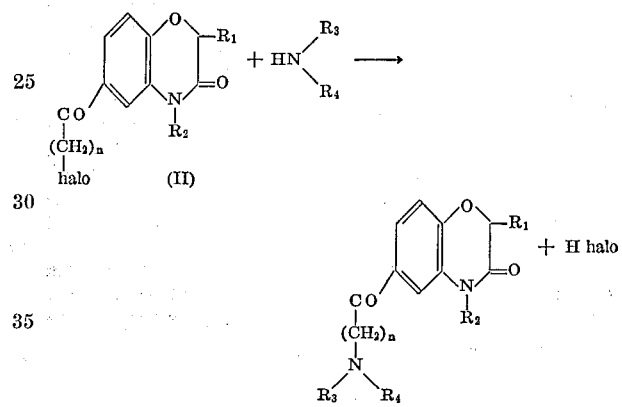

This reaction is usually carried out in the presence of an acceptor for the acid liberation. Such acid acceptors may be a volatile tertiary amine or an excess of the secondary amine. The reaction is frequently carried out in the presence of an excess of the secondary amine used which acts as the acid acceptor. In this case preferably 3 to 5 molecules of amine are used per molecule of halogenated derivative. If the secondary amine is difficult to separate from the reaction product because of its low volatility or its insolubility in water, it is preferable to use only a slight excess (1.1 mols) of this amine and to add to the reaction medium, as the acid acceptor, the volatile tertiary amine such as triethylamine. Usually 2 to 4 mols of tertiary amine are used per mol of halogenated derivative. This process is particularly valuable for the condensation of the halogenated derivatives II with 1-aryl-piperazines.

The reaction can be carried out in various solvents, such as lower alcohol, ethers, or dioxane. However, the use of dipolar aprotic solvents such as dimethylformamide (DMF) and dimethylsulphoxide (DMSO) has proved particularly favourable. The reaction temperature is usually ambient temperature (20° C.) to 100° C.

In compounds of Formula II wherein $n=1$, the halogen atom is particularly mobile and the reaction can frequently be carried out at room temperature. Using the proportions of reagents indicated above, the reaction is generally complete after a contact time of several hours.

After evaporating off the solvents and the excess amine under reduced pressure and taking up the residue in water the reaction product is isolated. If the benzoxazine of Formula I crystallises spontaneously it is filtered off and recrystallised from a suitable solvent. If a viscous oily precipitate is formed, this is dissolved in a suitable solvent, the organic phase is extracted with a dilute mineral acid (for example 2.5 N HCl), the acid solution is made alkaline with ammonia and the precipitated benzoxazine is extracted with an appropriate solvent. After the organic solution has been dried and the solvent evaporated off, the benzoxazine may be obtained as a solid and it is then recrystallised from a suitable solvent. If the benzoxazine is not solid after evaporation of the extraction solvent, it can be directly converted into a crystalline salt of a non-toxic, mineral or organic acid.

In certain cases it may be advantageous to prepare the salt of the base directly from the reaction mixture after having removed the excess secondary amine.

If the compounds of Formula I wherein $>C=X$ represents $>C=O$ and $n=1$ are prepared by condensation of a 1-aryl-piperazine and a 6-halogenacetyl-2,3-dihydrobenzoxazine (II, $n=1$) in the presence of triethylamine, the reaction is slower and it is of value to carry out the process at a temperature of between 50 and 100° C. in a solvent, preferably DMSO. The reaction is then complete in 3 to 4 hours. After cooling, the product is precipitated by dilution with water and purified in the manner described.

When compounds of Formula II wherein $>C=X$ represents $>C=O$ and $n=2$ are reacted with fatty secondary amines, piperidine or morpholine, the reaction described above is preferably carried out in DMF at room temperature. In general the reaction product is isolated by the method described above after the reagents have been left in contact overnight. When using 1-aryl-piperazines, in the presence of triethylamine, it is necessary to work at 70–100° C., with stirring. The reaction is usually complete in 2 to 4 hours and the reaction product may be isolated by dilution with water.

The benzoxazine derivative of this invention wherein $n=2$ and $>C=X$ represents $>C=O$ can also be prepared by condensing the hydrochloride of a secondary amine of the formula

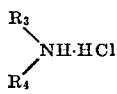

and formaldehyde with a 6-acetyl-3-oxo-2,3-dihydro-1,4-benzoxazine of the Formula III in accordance with the following equation:

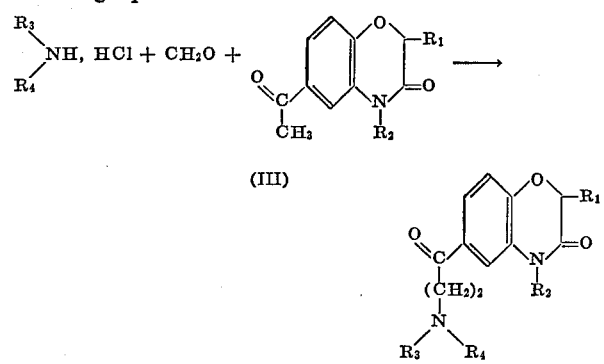

The compounds of Formula I wherein $>C=X$ represents $>C=O$ and $n=3$ may be prepared from 6-γ-halogenobutyryl-3-oxo-2,3-dihydro-1,4-benzoxazines wherein the halogen atom is much less mobile than in the preceding cases. In this case it is necessary, when using fatty amines, piperidine or morpholine and working in DMF as a solvent, to carry out the process at temperatures of about 100° C.; when using piperazine derivatives the use of DMSO as solvent at temperatures of 50–70° C. is particularly favourable to the process. The reaction products are isolated in accordance with the general processes described above.

(B) The compounds of Formula I wherein $>C=X$ represents

may be readily prepared by reducing the compounds of Formula I wherein $>C=X$ represents $>C=O$ in accordance with the following equation:

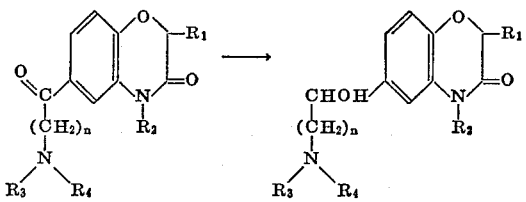

This reduction can be carried out by chemical reduction methods known per se, for example using an alkali metal borohydride in an appropriate organic solvent such as a lower fatty alcohol, preferably isopropanol.

The reduction may also be carried out catalytically. In this case it is preferable to use Raney nickel as catalyst and to use a lower alcohol as solvent. The efficiency of the catalyst is improved by the addition of small amounts of an alkali hydroxide.

In both cases the reaction product is isolated from the solution (after filtration if necessary) by evaporating off the solvent, taking up the residue in water, filtering and recrystallising the product.

(C) The compounds of Formula I wherein $>C=X$ represents

may be prepared by reacting secondary amines of formula

with 6 - ω - halogenalkyl - 3 - oxo - 2,3 - dihydro - 1,4-benzoxazines. In particular benzoxazines of Formula I wherein $>C=H$ represents

and $n$ is 3 may be prepared using 6-ω-chlorobutyl-3-oxo-2,3 - dihydro - 1,4 - benzoxazines IV in accordance with the following equation:

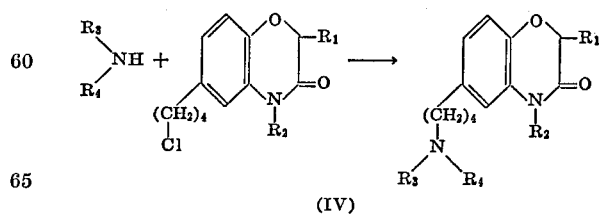

The reaction is preferably carried out in DMSO at a temperature of 70–80° C. The presence of a small amount of potassium iodide favours the reaction which, being rather slow, requires normally 5 to 8 hours heating.

The derivatives IV are advantageously prepared by catalytic hydrogenation of the corresponding 6-γ-chlorobutyryl-3-oxo-2,3-dihydro-1,4-benzoxazines in an acetic acid medium in the presence of palladium on charcoal.

Benzoxazines of the invention may readily be converted into their non-toxic acid addition salts by methods known per se. The monohydrochlorides of the derivatives wherein $-NR_3R_4$ is an aryl-piperazinyl radical are frequently sparingly soluble and the methanesulphonates, which are more soluble, may more readily be used in pharmacological tests than the other acid addition salts.

The benzoxazine derivatives of the invention have marked depressant properties on the central nervous system. These properties are particularly marked for the substances wherein $>C=X$ represents $>C=O$ or

$n$ is 3 and

represents 4-aryl-piperazinyl.

The following examples illustrate the invention.

EXAMPLE 1

6-α-diethylaminoacetyl-3-oxo - 2,3 - dihydro-1,4-benzoxazine hydrochloride (I, $R_1=R_2=H$, $X=O$, $n=1$, $R_3=R_4=C_2H_5$)

6.3 g. (0.086 mol) of diethylamine are added to a solution of 6.5 g. (0.029 mol) 6-α-chloracetyl-3-oxo-2,3-dihydro-1,4-benzoxazine in 13 ml. of dimethylformamide (DMF) in a flask equipped with a mechanical stirrer and a calcium chloride guard tube. The mixture is stirred for 4 hours at ambient temperature. The excess diethylamine is removed at 50° C. under a high vacuum. 50 ml. of ether are added to the residual solution. The diethylamine hydrochloride which precipitates is filtered off. The solution is rendered acid by adding a solution of hydrochloric acid in alcohol. The gummy precipitate is triturated with acetone, filtered off and then recrystallised from a mixture of methanol-ether.

Yield: 7.8 g. (90%), melting point: 267° C. (decomposition).

Analysis for $C_{14}H_{18}N_2O_3 \cdot HCl$.—Calculated (percent): C, 56.28; H, 6.41; N, 9.38; Cl, 11.88. Found (percent): C, 56.08; H, 6.57; N, 9.56; Cl, 11.95.

EXAMPLE 2

6-(α-pyrrolidinyl) - 3 - oxo - 2,3 - dihydro-1,4-benzoxazine hydrochloride (I, $R_1=R_2=H$, $X=O$, $n=1$, $-NR_3R_4=-NC_4H_8$)

6.5 g. of 6-chloracetyl - 3 - oxo-2,3-dihydro-1,4-benzoxazine and 6.1 g. of pyrrolidine dissolved in 13 ml. of DMF are stirred for 4 hours at ambient temperature, in the manner described in Example 1. The solution is rendered acid by adding a 4 N alcoholic solution of HCl. The precipitate is filtered off and recrystallised from ethanol. Yield: 7.8 g. (91%), melting point: 280° C. (decomposition).

Analysis for $C_{14}H_{18}N_2O_3 \cdot HCl$.—Calculated (percent): C, 56.66; H, 5.78; N, 9.44; Cl, 11.95. Found (percent): C, 56.63; H, 5.89; N, 9.42; Cl, 11.75.

EXAMPLE 3

6 - piperidinoacetyl-3-oxo-2,3-dihydro-1,4-benzoxazine (I, $R_1=R_2=H$; $X=O$, $n=1$, $-NR_3R_4=NC_5H_{10}$)

The reaction of 2.25 g. of 6-chloracetyl-3-oxo-2,3-dihydrobenzoxazine with 2.6 g. of piperidine dissolved in 5 ml. of DMF, under the experimental conditions described in Example 1, yields, after purifications described in the Example 1, 2.5 g. (80%) of hydrochloride, melting point 264° C. (decomposition).

Analysis for $C_{15}H_{18}N_2O_3 \cdot HCl$.—Calculated (percent): Cl, 11.43. Found (percent): Cl, 11.55.

The base is obtained by treating the aqueous solution of the hydrochloride with an excess of ammonia; the solid which has precipitated is filtered off, washed with water, dried and recrystallised from benzene. Melting point: 150° C.

Analysis for $C_{15}H_{18}N_2O_3$.—Calculated (percent): C, 65.67; H, 6.61; N, 10.21. Found (percent): C, 66.03; H, 6.74; N, 9.93.

EXAMPLE 4

6 - α-morpholinoacetyl-3-oxo-2,3-dihydro-1,4-benzoxazine (I, $R_1=R_2=H$, $X=O$, $n=1$, $NR_3R_4=-NC_4H_8O$)

2.25 g. of 6-chloracetyl-3-oxo-2,3-dihydro-1,4-benzoxazine and 2.6 g. of morpholine dissolved in 5 ml. of DMF are stirred for 4 hours at ambient temperature. The excess base and the solvent are evaporated at 100° C. under reduced pressure. The residue is dissolved in ether and the solution is filtered and then acidified with hydrochloric acid dissolved in ether. The hydrochloride precipitate is filtered off and recrystallised from a mixture of methanol and ether.

Yield: 2.2 g. (70%), melting point: 264° C. (decomposition).

Analysis for $C_{14}H_{17}ClNO_4$.—Calculated (percent): Cl, 11.35. Found (percent): Cl, 11.20.

The base, obtained using the method described in Example 3, is recrystallised from a mixture of acetone and hexane, melting point: 173° C.

Analysis for $C_{14}H_{16}N_2O_4$.—Calculated (percent): C, 60.86; H, 5.84; N, 10.14. Found (percent): C, 61.10; H, 5.95; N, 9.97.

EXAMPLE 5

6 - α - (4'-phenylpiperazino)acetyl-3-oxo-2,3-dihydro-1,4-benzoxazine (I, $R_1=R_2=H$; $X=O$, $n=1$, $-NH_3R_4=-NC_2H_4N-C_6H_5$)

A mixture of 11.3 g. (0.050 mol) of 6-α-chloracetyl-3-oxo-2,3-dihydro-1,4-benzoxazine, 10.5 g. (0.065 mol) of N-phenylpiperazine, 18.2 ml. of triethylamine and 15 ml. of dimethylsulphoxide (DMSO) is stirred for 4 hours at 60° C. in a 100 ml. reactor equipped with a condenser and a calcium chloride guard tube. After cooling, the mixture is diluted with 50 ml. of water. The precipitate is filtered off, washed with water and recrystallised from ethanol. Yield: 13.2 g. (75%), melting point: 247° C.

Analysis for $C_{20}H_{21}N_3O_3$.—Calculated (percent): C, 68.36; H, 6.02; N, 11.96. Found (percent): C, 68.66; H, 6.18; N, 11.90.

The monohydrochloride is prepared by neutralising the alcoholic solution of the base by means of an alcoholic solution of hydrochloric acid. It is precipitated by adding an equal volume of ether. Melting point: 275° C. (decomposition).

Analysis for $C_{20}H_{21}NO_3 \cdot HCl$.—Calculated (percent): Cl, 9.14. Found (percent): Cl, 9.13.

EXAMPLE 6

6-β-dimethylaminopropionyl-3-oxo-2,3-dihydro-1,4 - benzoxazine maleate (I, $R_1=R_2=H$; $X=O$, $n=2$, $R_3=R_4=CH_3$)

3 g. of 6-β-chloropropionyl-3-oxo-2,3-dihydro-1,4-benzoxazine, 5.7 g. of a 40% aqueous solution of dimethylamine and 5 ml. of dioxane are stirred for 2 hours at ordinary temperature. The solvents are evaporated off under reduced pressure, the residue is taken up in water and the insoluble mass is extracted with chloroform. The organic solution is dried ($Na_2SO_4$), the solvent is evaporated off under reduced pressure and the residue is dissolved in 15 ml. of ethanol. 2.6 g. of maleic acid dissolved in 15 ml. of ethanol are added to the solution of the base. The precipitate is filtered off and recrystallised from ethanol.

Yield: 3.2 g. (70%), melting point: 180° C.
Analysis for $C_{17}H_{20}N_2O_7$.—Calculated (percent): C, 56.04; N, 5.53; N, 7.69. Found (percent): C, 56.34; H, 5.66; N, 7.51.

EXAMPLE 7

6-β-diethylaminopropionyl-3-oxo-2,3-dihydro - 1,4 - benzoxazine (hydrochloride) I, $R_1=R_2=H$; $X=O$, $n=2$, $R_3=R_4=C_2H_5$)

6 g. (0.025 mol) of 6-β-chloropropionyl-3-oxo-2,3-dihydro-1,4-benzoxazine and 5.5 g. of diethylamine dissolved in 12 ml. of DMF are stirred for 2 hours at ordinary temperature. The solvents and the excess secondary amine are evaporated off at 100° C. under reduced pressure (10 mm.). The residue is taken up in 50 ml. of acetone and the solution is filtered and then acidified with an alcoholic solution of hydrochloric acid. The precipitate is filtered off and then recrystallised from ethanol.

Yield: 6.3 g. (80%), melting point: 198° C. (decomposition).
Analysis for $C_{15}H_{20}N_2O_3.HCl$.—Calculated (percent): C, 57.59; H, 6.77; N, 8.96; Cl, 11.34. Found (percent): C, 57.50; H, 7.00; N, 8.98; Cl, 10.98.

EXAMPLE 8

6-β-n-dibutylaminopropionyl-3-oxo - 2,3 - dihydro - 1,4-benzoxazine (hydrochloride) (I, $R_1=R_2=H$, $n=2$, $X=O$, $R_3=R_4=nC_4H_9$)

7 g. of 6-β-chloropropionyl-3-oxo-2,3-dihydro-1,4-benzoxazine and 11.4 g. of di-n-butylamine in 140 ml. of dioxane are left overnight at ordinary temperature. The solvent and the excess base are removed in vacuo at 100° C. and the residue is taken up in 100 ml. of ether. The filtered solution is rendered acid by adding an alcoholic solution of hydrochloric acid. The hydrochloride which has precipitated is filtered off and then recrystallised from ethanol.
Yield: 5.8 g. (54%), melting point: 206° C. (decomposition).

Analysis for $C_{19}H_{28}N_2O_3.HCl$.—Calculated (percent): C, 61.86; H, 7.92; N, 7.60, Cl, 9.61. Found (percent): C, 61.85; H, 8.18; N, 7.55; Cl, 9.50.

EXAMPLE 9

6-β-pyrrolidinopropionyl-3-oxo-2,3-dihydro - 1,4 - benzoxazine (hydrochloride) (I, $R_1=R_2=H$, $n=2$, $X=O$, $-NR_3R_4=N(CH_2)_4$)

Following the procedure of Example 8, using 6 g. of the chloroketone and 5.3 g. of pyrrolidine in 120 ml. of dioxane, 3.3 g. (45%) of 6-β-pyrrolidinopropionyl-3-oxo-2,3-dihydro-1,4-benzoxazine hydrochloride are obtained after recrystallisation from ethanol, melting point: 213° C. (decomposition).

Analysis for $C_{15}H_{18}N_2O_3.HCl$.—Calculated (percent): C, 57.97; H, 6.16; N, 9.02; Cl, 11.41. Found (percent): C, 58.05; H, 6.18; N, 9.22; Cl, 11.37.

EXAMPLE 10

6-β-piperidinopropionyl-3-oxo-2,3-dihydro - benzoxazine (I, $R_1=R_2=H$, $n=2$, $X=O$, $-NR_3R_4=-NH_5H_{10}$)

6 g. of 6-β-chloropropionyl-3-oxo-2,3-dihydro-1,4-benzoxazine are treated with 6.4 g. of piperidine in 120 ml. of dioxane by the method described in Example 8. The reaction product is isolated in the form of the hydrochloride as in Example 8, and is recrystallised from a mixture of methanol and ether.

Yield: 5.1 g. (62%), melting point: 250° C. (decomposition).
Analysis for $C_{16}H_{20}N_2O_3.HCl$.—Calculated (percent): C, 59.16; H, 6.52; N, 8.63; Cl, 10.92. Found (percent): C, 59.07; H, 6.69; N, 8.62; Cl, 10.71.

The hydrochloride solution, on treatment with ammonia, yields the solid base which is recrystallised from benzene, melting point: 132° C.

Analysis for $C_{16}H_{20}N_2O_3$.—Calculated (percent): C, 66.64; H, 6.99; N, 9.72. Found (percent): C, 66.50; H, 7.16; N, 9.62.

EXAMPLE 11

6-β-morpholinopropionyl-3-oxo-2,3-dihydro-1,4 - benzoxazine (I, $R_1=R_2=H$, $X=O$, $n=2$, $-NR_3R_4=-NC_4H_8O$)

(a) 6 g. of 6-β-chloropropionyl-3-oxo-2,3-dihydro-1,4-benzoxazine and 6.5 g. of morpholine dissolved in 18 ml. of DMF are left overnight at ordinary temperature. The solvent and the excess secondary amine are evaporated off under reduced pressure at 100° C. The residue is taken up in 50 ml. of water, the medium is rendered slightly alkaline by adding ammonia, and the solid is filtered off and dried and then recrystallised from benzene. 6.3 g. (87%) of 6-β-morpholinopropionyl-3-oxo-2,3-dihydro-1,4-benzoxazine are thus obtained (melting point: 157° C., and then 169° C.).

Analysis for $C_{15}H_{18}N_2O_4$.—Calculated (percent): C, 62.05; H, 6.25; N, 9.65. Found (percent): C, 62.04; H, 6.14; N, 9.70.

(b) 1.9 g. of 6-acetyl-3-oxo-2,3-dihydro-1,4-benzoxazine, 1.3 g. of trioxymethylene, and 1.3 g. of morpholine dissolved in 13 ml. of ethanol are treated with 1.2 ml. of concentrated hydrochloric acid and the mixture is heated for 8 hours under reflux. After cooling, the precipitate of the hydrochloride is filtered off and dissolved in water, and the solution is rendered alkaline by addition of ammonia. The base which has precipitated is filtered off, dried and recrystallised from benzene. Yield: 1.8 g. (62%), melting point: 157° C., and then 169° C. The product was identical to that obtained above.

6.4 g. of the base dissolved in 100 ml. of ethanol are treated with 2.8 g. of a maleic acid dissolved in 15 ml. of the same solvent. The maleate precipitate is filtered off, washed with ethanol and dried, melting point: 199° C.

Analysis for $C_{19}H_{22}N_2O_8$.—Calculated (percent): C, 56.15, H, 5.46, N, 6.89. Found (percent): C, 56.42; H, 5.54, N, 6.73.

EXAMPLE 12

6 - β - (4' - phenylpiperazino)propionyl-oxo-2,3-dihydro-1,4-benzoxazine (I, $R_1=R_2=H$, $X=O$, $n=2$,
$-NR_3R_4=-NC_4H_8N-C_6H_5$)

9.3 g. of 6-β-chloropropionyl-3-oxo - 2,3 - dihydro - 1,4-benzoxazine, 8.2 g. of N-phenylpiperazine and 14.1 g. of triethylamine dissolved in 12 ml. of DMF are vigorously stirred and heated to 70° C. for 2 hours in a flask fitted with a mechanical stirrer and a reflux condenser. After cooling to ambient temperature, the mixture is diluted with 60 ml. of water. The precipitate is filtered off, washed with water and recrystallised from ethanol. Yield: 11.8 g. (83%), melting point: 198° C.

Analysis for $C_{21}H_{23}N_3O_3$.—Calculated (percent): C, 69.02 ; H, 6.34; N, 11.50. Found (percent): C, 68.67; H, 6.52; N, 11.61.

The solution of the base in the minimum of alcohol is treated with a slight excess of concentrated HCl relative to the calculated amount, so as to form a monohydrochloride. The precipitate is filtered off, washed and recrystallised from a mixture of methanol (1 volume)-water (2 volumes), melting point: 262° C. (decomposition).

Analysis for $C_{21}H_{23}N_3O_3 \cdot HCl$.—Calculated (percent): Cl, 8.82. Found (percent): Cl, 8.88.

The methanesulphonate, prepared under the same conditions, is purified by recrystallisation from ethanol, melting point: 220° C.

Analysis for $C_{21}H_{23}N_2O_3 \cdot HO_3SCH_3$.—Calculated (percent): N, 9.11; S, 6.93. Found (percent): N, 8.98; S, 671.

EXAMPLE 13

6-γ-piperidinobutyryl-3-oxo-2,3-dihydro-1,4-benzoxazine (I, $R_1=R_2=H$, $X=O$, $n=3$, $—NR_4—R_5=—NC_5H_{10}$)

7.6 g. of 6-γ-chlorobutyryl-3-oxo-2,3-dihydro-1,4-benzoxazine (0.03 mol), 7.7 g. of piperidine (0.09 mol) and 10 ml. of DMF are heated for 3 hours at 90° C. in a flask surmounted by a reflux condenser. After cooling, the solution is diluted with 50 ml. of water and made acid by adding 5 ml. of concentrated HCl. The acid solution is extracted with ether to remove neutral impurities and is then rendered alkaline with ammonia. The precipitate is filtered off, dried and recrystallised from benzene.

Yield: 6.4 g. (70%), melting point: 166° C.

Analysis for $C_{17}H_{22}N_2O_3$.—Calculated (percent): C, 67.52; H, 7.33; N, 9.27. Found (percent): C, 67.72; H, 7.24; N, 9.27.

The hydrochloride is obtained by adding ethanol containing hydrogen chloride to an alcoholic solution of the base. It is recrystallised from ethanol, melting point: 219° C. (decomposition).

Analysis for $C_{17}H_{23}ClN_2O_3$.—Calculated (percent): C, 60.26; H, 6.84; N, 8.27; Cl, 10.46. Found (percent): C, 60.10; H, 7.04; N, 8.29; Cl, 10.51.

EXAMPLE 14

6-γ-morpholinobutyryl-3-oxo-2,3-dihydro-1,4-benzoxazine (I, $R_1=R_2=H$; $X=O$, $n=3$, $—NR_3R_4=—NC_4H_8O$)

This product is obtained using the method described in Example 13 by reaction of morpholine (7.8 p., 0.09 mol) with 6-γ-chlorobutyryl-3-oxo-2,3-dihydro-1,4-benzoxazine dissolved in DMF (10 ml.). Yield: 5.9 g. (65%), after recrystallisation from benzene, melting point: 163° C.

Analysis for $C_{16}H_{20}N_2O_4$.—Calculated (percent): C, 63.14; H, 6.62; N, 9.21. Found (percent): C, 63.17; H, 6.72; N, 9.18.

Hydrochloride melting point: 215° C. (decomposition)
Analysis for $C_{16}H_{20}N_2O_4 \cdot HCl$.—Calculated (percent): Cl, 10.42. Found (percent): Cl, 10.41.

EXAMPLE 15

6-γ-(4' - methylpiperazino)butyryl-3-oxo-2,3-dihydro-1,4-benzoxazine (I, $R_1=R_2=H$, $X=O$, $n=3$, $—NR_3R_4=—NC_4H_8N—CH_3$)

A mixture of 7.6 g. (0.03 mol) of 6-γ-chlorobutyryl-3-oxo-2,3-dihydro-1,4-benzoxazine, 3.9 g. (0.039 mol) of N-methyl-piperazine, 11 ml. of triethylamine and 10 ml. of dimethylsulphoxide is heated for 6 hours to 70° C. in a 50 ml. flask surmounted by a reflux condenser ($CaCl_2$ guard tube). After cooling, the mixture is diluted with 50 ml. of water. The reaction product is purified by the method described in Example 13 and by recrystallisation from benzene. Yield: 5.7 g. (60%), melting point: 130° C., and then 139° C.

Analysis for $C_{17}H_{23}N_3O_3$.—Calculated (percent): C, 64.33; H, 7.30; N, 13.24. Found (percent): C, 63.89; H, 7.27; N, 12.48.

The base, dissolved in acetone, when tested with an excess of hydrochloric acid dissolved in ether, yields a dihydrochloride which is purified by recrystallisation from aqueous acetone, melting point: 264° C. (decomposition).

Analysis for $C_{17}H_{23}N_3O_3 \cdot 2HCl$.—Calculated (percent): C, 52.31; H, 6.46; N, 10.76; Cl, 18.17. Found (percent): C, 52.45; H, 6.60; N, 10.75; Cl, 18.25.

EXAMPLE 16

6-γ-(4' - benzylpiperazino)butyryl-3-oxo-2,3-dihydro-1,4-benzoxazine (I, $R_1=R_2=H$, $X=O$, $n=3$, $NR_3R_4=—NC_4H_8N—CH_2C_6H_5$)

10 g. (0.0395 mol) of 6-γ-chlorobutyryl-3-oxo-2,3-dihydro-1,4-benzoxazine, 12.8 g. (0.0514 mol) of N-benzyl-piperazine dihydrochloride and 25.5 ml. (0.182 mol) of triethylamine in 12 ml. of DMSO are heated for 5 hours to 60° C. After cooling, the mixture is poured into 100 ml. of water to which 20 ml. of concentrated HCl have been added. The solution is treated with animal charcoal, filtered and rendered alkaline by adding ammonia. The base is extracted with chloroform. After drying (magnesium sulphate), the solvent is evaporated and the residue is recrystallised from 50% ethanol. Yield: 10.9 g. (75%), melting point: 161° C.

Analysis for $C_{23}H_{27}N_3O_3$.—Calculated (percent): C, 70.20; H, 6.92; N, 10.68. Found (percent): C, 70.21; H, 7.04; N, 10.66.

Dihydrochloride, melting point: 256° C. (recrystallised from 75% strength ethanol)

Analysis for $C_{23}H_{27}N_3O_3 \cdot 2HCl$.—Calculated (percent): C, 59.23; H, 6.27; N, 9.01; Cl, 15.20. Found (percent): C, 59.11; H, 6.10; N, 9.12; Cl, 14.95.

EXAMPLE 17

6 - γ - (4' - phenylpiperazinyl) butyryl-3-oxo-2,3-dihydro-1,4 - benzoxazine (I, $R_1=R_2=H$, $X=O$, $n=3$, $NR_3R_4=—NC_4H_8N—C_6H_5$)

25.3 g. (0.1 mol) of 6-γ-chlorobutyryl-3-oxo-2,3-dihydro-1,4-benzoxazine, 21 g. (0.13 mol) of N-phenyl-piperazine and 36.4 ml. of triethylamine in 30 ml. of DMSO are heated to 65° C. for 8 hours, whilst stirring. After cooling the solution is diluted with 180 ml. of water. The precipitate is filtered off, washed with water and recrystallised from ethanol. Yield: 29.3 (77%), melting point: 203° C.

Analysis for $C_{22}H_{25}N_3O_3$.—Calculated (percent): C, 69.63; H, 6.64; N, 11.08. Found (percent): C, 69.89; H, 6.78; N, 10.92.

7.6 g. of base are dissolved in 80 ml. of boiling ethanol. 2 ml. of concentrated HCl are added. After cooling, the monohydrochloride is filtered off and recrystallised from 60% ethanol. Yield 7.3 g. (88%), melting point 259° C. (decomposition).

Analysis for $C_{22}H_{25}N_3O_3 \cdot HCl$.—Calculated (percent): C, 63.53; H, 6.30; N, 10.10; Cl, 8.53. Found (percent): C, 63.52; H, 6.45; N, 10.14; Cl, 8.52.

EXAMPLE 18

6 - γ - [4'-(o-methoxyphenyl)-piperazino]butyryl-3-oxo-2,3 - dihydro - 1,4-benzoxazine (I, $R_1=R_2=H$, $X=O$, $n=3$, $—NR_3R_4=NC_4H_8N—C_6H_4OCH_3(o)$)

50.7 g. (0.2 mol) of 6-γ-chlorobutyryl-3-oxo-2,3-dihydro-1,4-benzoxazine, 42.8 g. (0.26 mol) of 1-(o-methoxyphenyl)piperazine and 73 ml. of (0.52 mol) of triethylamine in 60 ml. of DMSO are heated to 70° C. for 7 hours with stirring. After having been cooled, the mixture is diluted with 600 ml. of water. The precipitate is filtered off and washed with water and then with acetone (5× 50 ml.) to remove strongly coloured impurities. The product is recrystallised from benzene (1750 ml.). Yield: 58 g. (71%), melting point: 181° C.

Analysis for $C_{23}H_{27}N_3O_4$.—Calculated (percent): C, 67.46; H, 6.65; N, 10.26. Found (percent): C, 67.29; H, 6.64; N, 10.21.

29 g. of base, dissolved in 200 ml. of methyl Cellosolve are acidified with a 5 N alcoholic hydrochloric acid solution. The precipitate is filtered off and recrystallised from 500 ml. of 50% methanol. Yield: 25.8 g. (82%), melting point: 250° C. (decomposition).

Analysis for $C_{23}H_{27}N_3O_4 \cdot HCl$.—Calculated (percent): C, 61.94; H, 6.33; N, 9.49; Cl, 7.95. Found (percent): C, 62.15; H, 6.58; N, 9.56; Cl, 7.85.

EXAMPLE 19

6 - γ - [4' - (p-chlorophenyl)-piperazino]butyryl-3-oxo-2,3 - dihydro - 1,4-benzoxazine (I, $R_1=R_2=H$, $X=O$, $n=3$, $—NR_3R_4=—NC_4H_8N—C_6H_4Cl$ (p))

9.4 g. (0.037 mol) of 6-γ-chlorobutyryl-3-oxo-2,3-dihydro-1,4-benzoxazine, 9.4 g. (0.048 mol) of N-4-chlorophenylpiperazine, 13.5 ml. of triethylamine and 12 ml. of DMSO are treated in the manner described in Example 19 and the reaction product is recrystallised from methyl Cellosolve. Yield: 10.2 g. (68%), melting point: 206° C.

Analysis for $C_{22}H_{24}ClN_3O_3$.—Calculated (percent): C, 63.84; H, 5.84; N, 10.15; Cl, 8.57. Found (percent): C, 63.78; H, 5.78; N, 10.29; Cl, 8.61.

Monohydrochloride, melting point: 256° C. (decomposition).

EXAMPLE 20

4 - methyl - 6 - (γ-4'-phenylpiperazino)butyryl-3-oxo-2,3-dihydro-1,4-benzoxazine (I, $R_1=H$, $R_2=—CH_3$, $X=O$, $n=3$, $—NR_3R_4=—NC_4H_8N—C_6H_5$)

26.7 g. (0.1 mol) of 4-methyl-6-γ-chlorobutyryl-3-oxo-2,3-dihydro-1,4-benzoxazine, 21 g. (0.13 mol) of 1-phenylpiperazine, 36.4 ml. of triethylamine and 30 ml. of DMSO are stirred and heated to 60–70° C. for 8 hours. The reaction product is isolated in the manner described in Example 18; it is recrystallised from ethanol. Yield: 26.7 g. (68%), melting point: 97° C.

Analysis for $C_{23}H_{27}N_3O_3$.—Calculated (percent): C, 70.20; H, 6.92; N, 10.68. Found (percent): C, 70.34; H, 6.97; N, 10.84.

19.4 g. of the base, dissolved in 100 ml. of boiling methanol, are treated with 7 ml. of methanesulphonic acid. After cooling, the precipitate is filtered off and recrystallised from ethanol. Yield: 18.1 g. (75%), melting point: 180° C.

Analysis for $C_{23}H_{27}N_3O_3 \cdot HO_3SCH_3$.—Calculated (percent): N, 8.58; S, 6.54. Found (percent): N, 8.60; S, 6.42.

EXAMPLE 21

4 - ethyl - 6 - γ-(4'-phenylpiperazino)butyryl-3-oxo-2,3-dihydro - 1,4 - benzoxazine (I, $R_1=H$, $R_2=—C_2H_5$, $X=O$, $n=3$, $—NR_3R_4=—NC_4H_8N—C_6H_5$)

8.4 g. (0.03 mol) of 4-ethyl-6-γ-chlorobutyryl-3-oxo-2,3-dihydro-1,4-benzoxazine, 6.3 g. (0.039 mol) of N-phenylpiperazine, 11 ml. of triethylamine and 9 ml. of DMSO are stirred and heated for 9 hours at 60–70° C. After cooling, the mixture is poured into 90 ml. of water and the suspension is rendered acid by adding concentrated HCl. The solution is filtered to separate off insoluble matter and is then rendered alkaline by addition of ammonia. The precipitate is filtered off, washed with water and recrystallised from ethanol. Yield: 8.8 g. (72%), melting point: 109° C.

Analysis for $C_{24}H_{29}N_3O_3$.—Calculated (percent): C, 70.73; H, 7.17; N, 10.31. Found (percent): C, 70.91; H, 7.22; N, 10.35.

The methanesulphonate is prepared by the method described in Example 20 and is then recrystallised from ethanol, melting point: 177° C.

Analysis for $C_{24}H_{29}N_3O_3 \cdot HO_3SCH_3$.—Calculated (percent): N, 8.35; S, 6.35. Found (percent): N, 8.28; S, 6.31.

EXAMPLE 22

4 - propyl - 6 - γ - (4' - phenylpiperazino)butyryl-3-oxo-2,3-dihydro-1,4-benzoxazine (I, $R_1=H$, $R_2=C_3H_7$, $X=O$, $n=3$, $—NR_3R_4=—NC_4H_8NC_6H_5$)

29.5 g. (0.1 mol) of 4-n-propyl-6-γ-chlorobutyryl-3-oxo-2,3-dihydro-1,4-benzoxazine, 21 g. (0.13 mol) of N-phenyl-piperazine, 36.4 ml. of triethylamine and 30 ml. of DMSO are heated to 70° C. for 9 hours. After cooling, the mixture is added to 150 ml. of water. The suspension is rendered acid (pH 1) by adding concentrated HCl and then filtered and the filtrate rendered alkaline by addition of ammonia, and the base which has precipitated is extracted with ether (4× 100 ml.). The ether solution is dried ($K_2CO_3$), the solvent is evaporated off and the residue is recrystallised from methanol. Yield: 34 g. (81%), melting point: 67° C.

Analysis for $C_{25}H_{31}N_3O_3$.—Calculated (percent): C, 71.23; H, 7.41; N, 9.97. Found (percent): C, 71.19; H, 7.17; N, 10.19.

Methanesulphonate, recrystallised from ethanol, melting point: 160° C.

Analysis for $C_{25}H_{31}N_3O_3 \cdot HO_3SCH_3$.—Calculated (percent): C, 60.33; H, 6.82; N, 8.12; S, 6.18. Found (percent): C, 60.64; H, 7.07; N, 7.96; S, 6.07.

EXAMPLE 23

4-n-butyl-6-γ-(4'-phenylpiperazino)butyryl - 3 - oxo-2,3-dihydro-1,4-benzoxazine (I, $R_1=H$, $R_2=C_4H_9$, $X=O$, $n=3$, $—NR_3R_4=—NC_4H_8N—CH_5$)

A mixture of 4-n-butyl-6-γ-chlorobutyryl-3-oxo-2,3-dihydro-1,4-benzoxazine (2.9 g.), N-phenylpiperazine (2 g.), triethylamine (3.4 ml.) and DMSO (3 ml.) is stirred and heated to 60–70° C. for 7 hours. The reaction product is isolated by the method described in Example 22 and then recrystallised from a mixture of ether and petroleum ether. Yield: 3.3 g. (81%), melting point: 57° C.

Analysis for $C_{26}H_{33}N_3O_3$.—Calculated (percent): C, 71.69; H, 7.64; N, 9.65. Found (percent): C, 72.05; H, 7.85; N, 9.59.

Methanesulphonate, recrystallised from ethanol, melting point: 170° C.

Analysis for $C_{26}H_{33}N_3O_3 \cdot HO_3SCH_3$.—Calculated (percent): C, 61.00; H, 7.02; N, 7.91; S, 6.02. Found (percent): C, 60.93; H, 6.85; N, 8.01; S, 5.91.

EXAMPLE 24

2-ethyl-6-γ-(4'-phenylpiperazino)butyryl - 3 - oxo-2,3-dihydro-1,4-benzoxazine (I, $R_1=C_2H_5$, $R_2=H$, $X=O$, $n=3$, $—NR_3R_4=—NC_4H_8—NC_6H_5$)

This product is obtained using the method described in Example 23, from 6γ-chlorobutyryl-2-ethyl-3-oxo-2,3-dihydro-1,4-benzoxazine and phenylpiperazine in the presence of triethylamine, in DMSO. The base is recrystallised from ethanol. Melting point: 155° C.

Analysis for $C_{24}H_{29}N_3O_3$.—Calculated (percent): C, 70.73; H, 7.17; N, 10.31. Found (percent): C, 70.74; H, 6.98; N, 10.37.

Methanesulphonate, recrystallised from ethanol, melting point: 177° C.

Analysis for $C_{24}H_{29}N_3O_3 \cdot HO_3SCH_3$.—Calculated (percent): C, 59.63; H, 6.61; N, 8.35; S, 6.35. Found (percent): C, 59.87; H, 6.80; N, 8.18; S, 6.29.

EXAMPLE 25

6-γ-[4'-(o - methoxyphenyl)piperazino]butyryl-4-methyl-3-oxo-2,3-dihydro-1,4-benzoxazine [I, $R_1$=H,
$R_2$=$CH_3$,
$X$=O, $n$=4,
—$NR_3R_4$=—$NC_4H_8N$—$C_6H_4$—$OCH_3(o)$]

The reaction 6-γ-chlorobutyryl-4-methyl-3-oxo-2,3-dihydro-1,4-benzoxazine and N-2'-methoxyphenylpiperazine in the presence of triethylamine, in DMSO, is carried out by the method described in Example 21. The reaction product is recrystallised from acetone, melting point: 129° C. (yield: 60%).

Analysis: for $C_{24}H_{29}N_3O_4$.—Calculated (percent): C, 68.06; H, 6.90; N, 9.92. Found (percent): C, 67.80; H, 7.17; N, 9.84.

Methanesulphonate, melting point: 176° C. (recrystallised from ethanol)

Analysis for $C_{24}H_{29}N_3O_4 \cdot HO_3SCH_3$.—Calculated (percent): C, 57.79; H, 6.40; N, 8.09; S, 6.16. Found (percent): C, 57.50; H, 6.64; N, 7.84; S, 6.09.

EXAMPLE 26

6-[1'-hydroxy-4'-(4''-phenyl - 1'' - piperazinyl)]butyl-3-oxo-2,3-dihydro - 1,4 - benzoxazine (I, $R_1$=$R_2$=H, C=X=CHOH, $n$=3, —$NR_3R_4$=—$NC_4H_8N$—$C_6H_5$)

25.6 g. (0.0676 mol) of 6-γ-(4'-phenylpiperazino)butyryl-3-oxo-2,3-dihydro-1,4-benzoxazine and 2.7 g. of sodium borohydride in 250 ml. of isopropanol are heated under reflux for 5 hours. The solvent is driven off under reduced pressure on a water bath. The residue is taken up in water, filtered off, washed with water and then recrystallised from dioxane.

Yield: 23 g. (89%), melting point: 200° C.

Analysis for $C_{22}H_{27}N_3O_3$.—Calculated (percent): C, 69.27; H, 7.13; N, 11.02. Found (percent): C, 68.75; H, 7.45; N, 10.83.

16 g. of the base suspended in 80 ml. of ethanol are treated hot with 4.5 g. of methanesulphonic acid. The cloudy solution is left to cool. The precipitate is filtered off and recrystallised from ethanol.

Yield: 18.9 g. (94%), melting point: 191° C.

Analysis for $C_{22}H_{27}N_3O_3 \cdot HO_3SCH_3$.—Calculated (percent): C, 57.85; H, 6.54; N, 8.80; S, 6.71. Found (percent): C, 57.40; H, 6.30; N, 8.60; S, 6.71.

EXAMPLE 27

6 - [1'-hydroxy-4'-(4''-o-methoxyphenyl-1''-piperazinyl)]butyl-4-methyl-3-oxo-2,3-dihydro-1,4 - benzoxazine (I, $R_1$=H, $R_2$=—$CH_3$, C=X=—CHOH,
—$NR_3R_4$=—$NC_4H_8N$—$C_6H_4OCH_3(o)$)
$n$=3

6 g. of the ketone prepared by the method described in Example 25, dissolved in 150 ml. of ethanol with the addition of 1 ml. of N NaOH, are hydrogenated at 60° C. in the presence of 5 g. of Raney nickel. The process is complete in 70 minutes. (Volume absorbed (at 22° C.): 350 ml., theory: 345 ml.) The solution is filtered, concentrated under reduced pressure to about half its volume and diluted with 200 ml. of water. The precipitate is filtered off, washed with water, dried under reduced pressure over phosphorus pentoxide and then recrystallised from a mixture of ethyl acetate-hexane.

Yield: 5.2 g. (86%), melting point: 125° C.

Analysis for $C_{24}H_{31}N_3O_4$.—Calculated (percent): C, 67.74; H, 7.34; N, 9.88. Found (percent): C, 67.43; H, 7.50; N, 9.79.

Monohydrochloride, melting point: 226° C. (decomposition)—recrystallised from ethanol.

Analysis for $C_{24}H_{31}N_3O_4 \cdot HCl$.—Calculated (percent): C, 62.39; H, 6.98; N, 9.09; Cl, 7.67. Found (percent): C, 62.36; H, 6.97; N, 9.24; Cl, 7.62.

EXAMPLE 28

6 - [4'-(4''-phenyl - 1'' - piperazinyl)]butyryl-3-oxo-2,3-dihydro-1,4-benzoxazine (I, $R_1$=$R_2$=H, C=X=$CH_2$, $n$=3, —$NR_3R_4$=—$NC_4H_8N$—$C_6H_5$)

25.5 g. (0.1 mol) of 6-γ-chlorobutyryl-3-oxo-2,3-dihydro-1,4-benzoxazine dissolved in 500 ml. of glacial acetic acid with the addition of 1 ml. of concentrated HCl are hydrogenated at atmospheric pressure and ordinary temperature (22° C.) in the presence of 2.6 g. of 5% palladium on charcoal. The process is complete in 75 minutes (volume absorbed: 4,900 ml., theory: 4,860 ml.). The solution is filtered, and the solvent is evaporated off under reduced pressure at 100° C. The residue is taken up in 200 ml. of water. The precipitate is filtered off, washed with water, dried over phosphorus pentoxide and recrystallised from cyclohexane (250 ml.); 23 g. of 6-γ-chlorobutyl-3-oxo-2,3-dihydro-1,4-benzoxazine (95%) are thus obtained, melting point: 112° C.

23.9 g. (0.1 mol) of 6-γ-chlorobutyl-3-oxo-2,3-dihydro-1,4-benzoxazine, 21 g. of N-phenylpiperazine, 36.4 ml. of triethylamine, 1 g. of sodium iodide and 30 ml. of DMSO are heated to 70° C. for 5 hours. After cooling, the mass is taken up in 180 ml. of water. The precipitate is filtered off, washed with water, dried under reduced pressure and then recrystallised from ethanol. Yield: 23 g. (63%), melting point: 173° C.

Analysis for $C_{22}H_{27}N_3O_2$.—Calculated (percent): C, 72.30; H, 7.45; N, 11.50. Found (percent): C, 72.18; H, 7.66; N, 11.43.

Methanesulphonate, melting point: 199° C., recrystallised from ethanol.

Analysis for $C_{22}H_{27}N_3O_2 \cdot HO_3SCH_3$.—Calculated (percent): C, 59.85; H, 6.77; N, 9.11; S, 6.91. Found (percent): C, 59.75; H, 6.64; N, 9.03; S, 6.78.

EXAMPLE 29

6-ω-(4'-o-methoxyphenylpiperazinyl-1')butyl - 4 - methyl-3 - oxo - 2,3 - dihydro - 1,4 - benzoxazine (I, $R_1$=H, $R_2$=$CH_3$, >C=X=$CH_2$, $n$=3,
—$NR_3R_4$=—$NC_4H_8N$—$C_6H_4OCH_3(o)$)

As described in Example 28, catalytic hydrogenation of 6-γ-chlorobutyryl-4-methyl - 3 - oxo-2,3-dihydro-1,4-benzoxazine in the presence of palladium on charcoal yields 6-ω-chlorobutyl - 4 - methyl-3-oxo-2,3-dihydro-1,4-benzoxazine in a yield of 70%, M.P. 51° C. (recrystallised from cyclohexane). 12.6 g. of the latter, 12.5 g. of N-(o-methoxyphenyl)-piperazine, 13 ml. of triethylamine and 15 ml. of DMSO are heated to 70° C. for 7 hours and then 100° C. for 2 hours. After cooling, the mixture is poured into 150 ml. of water and the aqueous solution is extracted with diethyl ether (3 × 100 ml.). The ether solution is extracted with 3 × 25 ml. of 2 N HCl and then with water (3 × 25 ml.). The combined aqueous phases are concentrated under reduced pressure to about half their initial volume. The hydrochloride which precipitates on cooling is filtered off and recrystallised from water. It retains ½ molecule of water of crystallisation, and melts at 205° C.

Analysis for $C_{24}H_{31}N_3O_3 \cdot HCl \cdot \frac{1}{2}H_2O$.—Calculated (percent): C, 63.35; H, 7.31; N, 9.24; Cl, 7.79. Found (percent): C, 63.11; H, 7.49; N, 9.26; Cl, 7.98.

The base, which is liberated from the hydrochloride with ammonia, is recrystallised from isopropyl ether, M.P. 86° C.

Analysis for $C_{24}H_{31}N_3O_3$.—Calculated (percent): C, 70.39; H, 7.63; N, 10.26. Found (percent): C, 70.22; H, 7.59; N, 10.35.

The compounds of the invention show marked depressant properties towards the central nervous system. This activity has been demonstrated by the so-called activography method. A batch of 6 mice is given the substance tested, while a comparison batch of 6 mice receives the volume of solvent used for administering the product tested. After half an hour, the animals are separately placed in cages connected to a counter which allows the frequency of the movements of the animals to be determined. After five minutes (adaptation phase) counting is carried out for 15 minutes. The dose which reduces the motility of the animals of the treated batch by 50% relative to the comparison batch ($ED_{50}$) is determined.

The products of the various examples were administered intraperitoneally and orally. The salts described in the examples quoted were used.

The results obtained with the most active substances in this test are summarised in the Table I below which also shows the $LD_{50}$ of the products studied, determined intraperitoneally (I.P.) and orally (P.O.) in mice.

TABLE I

| Product of Example No. | Toxicity ($LD_{50}$) (mg./kg.) | | Motility ($ED_{50}$) (mg./kg.) | | $ED_{50}/LD_{50}$ | |
|---|---|---|---|---|---|---|
| | I.p. | P.o. | I.p. | P.o. | I.p. | P.o. |
| 1 | 360 | 800 | 70 | | 0.1 | |
| 3 | 180 | 220 | 40 | | 0.2 | |
| 4 | 850 | 950 | 180 | | 0.2 | |
| 7 | 425 | 950 | 85 | | 0.2 | |
| 9 | 160 | 700 | 30 | | 0.2 | |
| 11 | 400 | >1,500 | 80 | | 0.2 | |
| 12 | 625 | 1,000 | 2 | | 0.003 | |
| 15 | 475 | >1,500 | 5 | | 0.01 | |
| 17 | 850 | 700 | 4 | | 0.004 | |
| 18 | 108 | 350 | 1-2 | 5-10 | 0.009-0.02 | 0.01-0.02 |
| 19 | 360 | 1,000 | 5 | | 0.01 | |
| 20 | 160 | 520 | 2 | 5 | 0.01 | 0.01 |
| 21 | 105 | 229 | 2 | 9 | 0.01 | 0.04 |
| 22 | 120 | 300 | 5 | 20 | 0.04 | 0.06 |
| 23 | 117 | 500 | 10 | >29 | 0.08 | |
| 24 | 200 | 400 | 2 | 5 | 0.01 | 0.01 |
| 25 | 200 | 330 | 7 | 5-10 | 0.03 | 0.01-0.03 |
| 26 | 190 | 350 | 1 | | 0.05 | |
| 27 | 72.5 | 135 | 1 | 1-2 | 0.01 | 0.07-0.01 |
| 28 | 500 | | 1 | | 0.002 | |
| 29 | 87 | 180 | 1-2 | 2 | 0.01-0.02 | 0.01 |

Examination of this table shows that the majority of the compounds are very active in this test.

The coefficients $$\frac{ED_{50}}{LD_{50}}$$

are particularly favourable for the compounds where $n=3$, especially for those of Examples 15 to 29, for which the intense activity in the motility test can be attributed to a neuroleptic action.

The neuroleptic activity was demonstrated for the most active compounds by the following tests:

(a) Antagonism to amphetamine toxicity.—The same dose of the product to be studied is administered intraperitoneally to each animal of a batch of 10 mice and 30 minutes later the minimum fatal dose of amphetamine is injected into each animal. The mortality is assessed after 24 hours. For each product, the dose which protects 50% of the animals is determined. The results are given in the first column of Table II below.

(b) Open field test.—This technique (J. Boissier Therapie 1961, 16, pp. 279–286) makes it possible to determine the influence of a product on the exploratory motility of a rat placed in an enclosure it does not know.

The open field consists of a cylinder open at its upper part. It has a diameter of 100 cm. and a height of 50 cm. The dark background is divided into 6 equal parts by 3 diametrical lines painted white. A source of light illuminates the enclosure. When a rat is introduced into the apparatus, it is possible to assess its behaviour by counting the number of times that it crosses a line (motility) and the number of times that it stands up against the wall (curiosity) during a given time (3 minutes). Batches of 6 animals are observed at various times after administration of the product (intraperitoneally); the behaviour of the treated batches was compared with that of a comparison batch. The dose which reduces the motility of the animals by 50% 1 hour after administration of the product was determined. The results are given in the second column of Table II below.

(c) Cataleptigenic action.—(J. Bossier—Therapie 1963, T. 18, p. 1257). The test is carried out on batches of 6 to 10 rats weighing 150 to 200 g. The animals are observed every hour for at least 5 hours. The cataleptic activity for each animal is recorded, in accordance with the procedure of the author of the test, from 0 to 4, taking into account: the fixedness of attitude, the active negativism (the animal resists movement by roughly executing a movement in the opposite direction), and the preservation of the position in which homolateral paws are crossed. The first two factors quoted are recorded out of 1 and the third out of 2.

For a batch of $n$ animals, the maximum cataleptigenic activity would be represented by $4n$. If $\epsilon$ is the sum of the activities found for the various animals of the batch, the percentage of cataleptigenic activity can be represented by $$\frac{\epsilon}{4n} \times 100$$

The results are given in Table II below which also indicates, for each dose, the time after which this activity is maximum.

The compounds which are most active in the three tests (a), (b), and (c) were also studied for their anti-apomorphine action in rats. The subcutaneous injection of 1.5 mg./kg. of this substance into the animal causes masticating movements which correspond to the emetic action of the product in other animal species. The injection of an antagonistic product brings about the suppression of the syndrome in all or part of the animals. For the active doses of the substances studied, the duration of action on (intraperitoneally) injection the doses, either at the same time or 30 minutes, or one hour before the administration of the apomorphine was determined. Table II indicates the percentage of animals protected under these experimental conditions.

TABLE II

| Product of Example No. | Antagonism to amphetamine ($PD_{50}$)(mg./kg.) | Open field ($ED_{50}$) (mg./kg.) | Catalepsy | | |
|---|---|---|---|---|---|
| | | | Dose, mg./kg. | Percent catalepsy | Maximum action, hr. |
| 15 | 10 | 10 | 20-40 | 0 | |
| 16 | 10 | 10 | 20-40 | 0 | |
| 17 | 2.5 | 5 | 10-100 | 0 | |
| | | | 200 | 15 | 4 |
| 18 | 0.18 | 5 | 30 | 0 | |
| | | | 50 | 25 | 3 |
| 19 | 2-5 | 5 | 20 | 28 | 4 |
| | | | 40 | 25 | 5 |
| | | | 20 | 10 | 1 |
| 20 | 3.5 | 2.2 | 30 | 10 | 1 |
| | | | 40 | 35 | 1 |
| | | | 25 | 37 | 2 |
| 21 | 3 | 4 | 50 | 45 | 3 |
| | | | 10 | 5 | ½ |
| 22 | 10 | 10 | 20 | 18 | ½ |
| | | | 30 | 48 | ½ |
| 23 | 5 | 10 | | | |
| | | | 10 | 25 | 1 |
| 24 | 10 | 7 | 20 | 30 | 1 |
| | | | 40 | 32 | 2 |
| | | | 20 | 36 | 1 |
| 25 | 0.5 | 10 | 30 | 70 | 1 |
| | | | 10 | 12 | ½ |
| 26 | 2-5 | 5 | 30 | 42 | 1 |
| | | | 40 | 54 | 1 |
| | | | 10 | 10 | 1 |
| 27 | 1 | 5 | 20 | 42 | 1 |
| | | | 30 | 100 | 1 |
| 28 | 0.5 | 5 | 20 | 10 | 2 |
| | | | | 30 | 1 |
| 29 | 1-2 | 5 | 10 | 15 | 1 |
| | | | 30 | 45 | 1 |

The central depressant action of the compounds of the invention was also demonstrated by investigating the hypothermic action in rats kept in a constant temperature room. The rectal temperature of the animals was measured before administration of the product and then at regular intervals thereafter. The results given in Table III indicate the maximum hypothermy which was observed.

TABLE III

| Product of Example No. | Anti-apomorphine test, percent inhibition | | | Dose, mg./kg. | Temperature, lowering, deg. | Autonomous nervous system, Inv.=inversion |
|---|---|---|---|---|---|---|
| | Dose, mg./kg. | Simultaneous | 30 mins. | 1 hr. | | | |
| 15 | | | | | | | Adrenolytic to 100 γ/kg. (Inv.). |
| 16 | | | | | | 0.6 | Adrenolytic to 100 γ/kg. |
| 17 | 25-100 | | | 0 | 100 | 1.6 | Adrenolytic to 25 γ/kg. to 100 γ/kg./Inv. |
| 18 | 25 / 50 | 100 | | 60 | 10 | 0.8 | Adrenolytic to 100 γ/kg. (Inv.). |
| 19 | 25 | | 0 | | 10 | 0.4 | Adrenolytic to 100 γ/kg. |
| 20 | 25 | 0 | 0 | | 10 | 1.6 | Adrenolytic to 25 γ/kg. Inv. to 50 γ/kg. |
| 21 | 25 | | 0 | 0 | 10 | 0.5 | Adrenolytic to 100 γ/kg. (Inv.). |
| 22 | 25 | 60 | 0 | | 10 | 0.6 | Adrenolytic to 100 γ/kg. (Inv.). |
| 23 | 25 | | 0 | | 10 | 1.8 | Adrenolytic to 100 γ/kg. |
| 24 | 25 | 60 | 10 | | | | Adrenolytic to 200 γ/kg. |
| 25 | 25 / 30 | 70 / 100 | 30 / 40 | 0 / 10 | 5 / 10 | 1.5 / 1.9 | Adrenolytic to 50 γ/kg. Inv. to 100 γ/kg. |
| 26 | 25 | 60 | 0 | | 10 | 0.88 | Adrenolytic to 100 γ/kg. (Inv.). |
| 27 | 10 | | 70 | 30 | 10 | 0.8 | Adrenolytic to 50 γ/kg. |
| 28 | 25 | 60-100 | 40-90 | | 10 | 1 | Adrenolytic to 100 γ/kg. (Inv.). |
| 29 | 10 / 15 | 40-80 / 40-100 | 0 / 30 | | 5 / 10 | 1.5 / 1.3 | Adrenolytic to 100 γ. |

It emerges from the pharmacodynamic results that the products of the invention have a marked depressant action on the central nervous system. These properties are particularly intense for the following compounds, which are neuroleptics:

6-γ-[4'-(o-methoxyphenyl)piperazino]butyryl-4-methoxy-3-oxo-2,3-dihydro-1,4-benzoxazine (Example 25)

6-[1'-hydroxy-4'-(4''-o-methoxyphenyl-piperazinyl-1'')]butyl-4-methyl-3-oxo-2,3-dihydro-1,4-benzoxazine (Example 27)

6-[4'-(4''-phenylpiperazinyl-1'')]butyl-3-oxo-2,3-dihydro-1,4-benzoxazine (Example 28)

6-ω-[(4'-o-methoxyphenyl) piperazinyl-1']butyl-4-methyl-3-oxo-2,3-dihydro-1,4-benzoxazine (Example 29).

The compounds of the invention also act on the autonomic nervous system. The last column of Table III shows the adrenolytic properties of the substances when they are administered intravenously to chloralosed dogs.

We claim:
1. A 3-oxo-2,3-dihydro-1,4-benzoxazine of the formula:

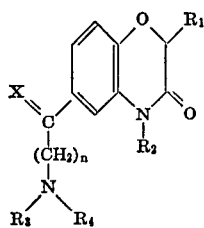

wherein each of $R_1$ and $R_2$, which may be the same or different, represents a hydrogen atom or lower alkyl; each of $R_3$ and $R_4$ which may be the same or different represents lower alkyl or $R_3$ and $R_4$ together with the nitrogen atom to which they are attached form 4-lower-alkylpiperazinyl, 4-phenylpiperazinyl, o-methoxyphenylpiperazinyl, p-chlorophenylpiperazinyl or benzylpiperazinyl >C=X represents >C=O,

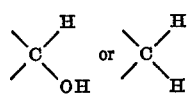

and $n$ is an integer of 1 to 4; or the non-toxic acid addition salts thereof.

2. A 3-oxo-2,3-dihydro-1,4-benzoxazine according to claim 1 wherein $R_1$ and $R_2$ together with the nitrogen atom to which they are attached form piperidyl, pyrrolidyl, morpholino, piperazinyl, 4-lower-alkylpiperazinyl, 4-phenylpiperazinyl, o-methoxyphenylpiperazinyl, p-chlorophenylpiperazinyl or benzylpiperazinyl.

3. A compound according to claim 1 which is 6-γ-[4'-(o-methoxy-phenyl)-piperazino]butyryl - 4-methyl-3-oxo-2,3-dihydro-1,4-benzoxazine or its non-toxic acid addition salts.

4. A compound according to claim 1 which is 6-[1'-hydroxy - 4' - (4'' - o-methoxyphenyl)-1''-piperazinyl]butyl - 4-methyl-3-oxo-2,3-dihydro-1,4-benzoxazine, or its non-toxic acid addition salts.

5. A compound according to claim 1 which is 6-[4'(4''-phenyl - 1'' - piperazinyl)]butyl - 3-oxo-2,3-dihydro-1,4-benzoxazine, or its non-toxic acid addition salts.

6. A compound according to claim 7 which is 6-ω-[(4' - o - methoxyphenyl)-1'-piperazinyl]butyl-4-methyl-3-oxo-2,3-dihydro-1,4-benzoxazine, or its non-toxic acid addition salts.

7. The compound of claim 2 wherein the phenyl of the phenylpiperazinyl is o-methoxy- or p-chloro- substituted.

8. The compound of claim 7 which is 6-γ-[4'-(p-chlorophenyl) - piperazino]butyryl - 3 - oxo-2,3-dihydro-1,4-benzoxazine.

References Cited

UNITED STATES PATENTS

| 3,401,166 | 9/1968 | Krapcho | 260—244 R |
| 3,557,103 | 1/1971 | Nordin | 260—244 R |

FOREIGN PATENTS

| 1,307,154 | 9/1962 | France | 260—244 R |
| 1,560,628 | 2/1969 | France | 260—244 R |

OTHER REFERENCES

Kadaba, J. Heterocyclic Chem., vol. 3, pp. 345-7 (1966).

Kurihara et al., Chem. Abst., vol. 59, columns 2808-9 (1963).

Ramage et al., Chem. Abst., vol. 64, column 17,613 (1966).

Vaughan, Jr., et al., Chem. Abst., vol. 50, columns 8606-8 (1956).

NATALIE TROUSOF, Primary Examiner

U.S. Cl. X.R.

260—247.2A; 424—248